US007892585B1

(12) United States Patent
Nilsson et al.

(10) Patent No.: US 7,892,585 B1
(45) Date of Patent: Feb. 22, 2011

(54) METHOD OF PREVENTING BACTERIOPHAGE INFECTION OF BACTERIAL CULTURES

(75) Inventors: Dan Nilsson, Espergærde (DK); Thomas Janzen, Frederiksberg (DK)

(73) Assignee: CHR Hansen A/S, Horsholm (DK)

( * ) Notice: Subject to any disclaimer, the term of this patent is extended or adjusted under 35 U.S.C. 154(b) by 0 days.

(21) Appl. No.: 09/720,096

(22) PCT Filed: Jul. 2, 1999

(86) PCT No.: PCT/DK99/00382
§ 371 (c)(1),
(2), (4) Date: Feb. 1, 2001

(87) PCT Pub. No.: WO00/01799

PCT Pub. Date: Jan. 13, 2000

Related U.S. Application Data

(60) Provisional application No. 60/091,735, filed on Jul. 6, 1998.

(30) Foreign Application Priority Data

Jul. 3, 1998 (DK) .............................. 1998 00878

(51) Int. Cl.
*A23C 9/12* (2006.01)

(52) U.S. Cl. ....................................................... 426/43

(58) Field of Classification Search ................. 435/139, 435/243
See application file for complete search history.

(56) References Cited

U.S. PATENT DOCUMENTS 3,720,520 A * 3/1973 Luksas .......................... 426/42
4,294,930 A * 10/1981 Barach et al. ................. 435/261
4,900,669 A   2/1990 Hatch et al. ................... 435/108
5,691,185 A * 11/1997 Dickely et al. ............ 435/172.3

FOREIGN PATENT DOCUMENTS

| FR | 2701715    | 8/1994 |
| WO | WO 87/03006 | 5/1987 |
| WO | WO 95/10621 | 4/1995 |
| WO | WO 98/10089 | 3/1998 |

OTHER PUBLICATIONS

Daly et al. Antonie van Leeuwenhoek 70:90-110, 1996.*
Doskocil et al. Biochem et Biophys Acta 145:780-791, 1967.*
Ross et al. Appl Environ Microbiol 56:2164-2169, 1990.*
Johansen et al. Dev Biol Stand 85:531-34, 1995.*
Herrington et al. (1984) J Bacteriol 157(1):126-129.*
Jochimsen et al., Mol. Gen. Genet. 143:85-91, 1975.*
Groboillot et al., Biotechnol. Bioengineer. 42:1157-1163, 1993.*
Meagher, et al., "Protein Expression in *E. coli* Minicells by Recombinant Plasmids", Cell, vol. 10, p. 521-536, Mar. 1977.
Helling, et al., Nalidixic Acid-Resistant Auxotrophs of *Escherichia coli*, Journal of Bacteriology, vol. 104, No. 2, p. 1027-1029, Nov. 1970.
Worland, et al., "*Rhizobium* purine auxotrophs, perturbed in nodulation, have multiple changes in protein synthesis", Aust. J. Plant Physiosl, vol. 26, p. 511-519, 1999.
Pedersen et al., "Increasing acidification of nonreplicating *Lactococcus latis* ΔthyA mutants by incorporating ATPase activity," Applied and Environmental Microbiology, Nov. 2002, pp. 5249-5257, vol. 68, No. 11.
Pedersen et al., "Bacteriophage resistance of a ΔthyA mutant of *Lactococcus latis* blocked in DNA replication," Applied and Environmental Microbiology, Jun. 2002, pp. 3010-3023, vol. No. 6.
Anton, A. H., et al. "Thymidine-requiring variant of *Lactobacillus casei*" J Bacteriol 77(1):117-8, 1959.
Breheny, S, et al. "Effect of temperature on growth and acid production of lactic acid bacteria, the uncoupling of acid production from growth" Aust J Dairy Technol 30:145-148, 1975.
Desjardins, M. L., et al. "Uncoupling of growth and acids production in *Bifidobacterium* ssp." J Dairy Sci 73:1478-1484, 1990.
Deutch, C.E., et al. "Survival and macromolecular synthesis during incubation of *Escherichia coli* in limiting thymine" J Bacteriol 106:197-203, 1971.
Singer, S, et al. "Induction of an absolute thymine requirement in *Lactobacillus casei*" Bacteriol Proc., p. 127, 1958.
Derwent Abstract (XP-002082747) of SU 1439121 (1988), Mar. 19, 2002.
Dickely, Francoise et al., Isolation of *Lactococcus lactis* nonsense suppressors and construction of a food-grade cloning vector Mol. Microbiol, 15:839-847 (1995).
Nilsson, D. and Lauridsen, A, Isolation of purine, auxotrophic mutants of *Lactococcus lactis* and characterization of the gene *hpt* encoding hypoxanthine guanine phosphoribosyltransferase Mol. Gen. Genet, 235:359-364 (1992).
Terzaghi, B.E. and Sandine, W.E., Improved Medium for lactic Streptococci and Their Bacteriophages, Appl. Microbiol. 29:807-813 (1975).
Biswas, I. et al., High-efficiency gene inactivation and replacement system for gram-positive bacteria, Journal of Bacteriology, 175:3628-3635 (1993).
Maguin, E. et al., Efficient Insertional Mutagenesis in Lactococci and Other Gram-Positive Bacteria, Journal of Bacteriology, 178:931-935 (1996).
Sanders, Mary Ellen, Phage resistance in lactic acid bacteria, Biochimie 70:411-421 (1988).
Sing, W.D. and Klaenhammer, T.R., A Strategy for Rotation of Different Bacteriophage Defenses in a Lactococcal Single-Strain Starter Culture System, Applied and Environmental Microbiology, p. 365-372 (1993).
Venema, J.H. et al., Lactic Acid Bacteria: Genetics, Metabolism and Applications, FEMS (1996).
Henriksen, C.M. et al., Modelling of the Protonophoric Uncoupling by Phenoxyacetic Acid of the Plasma Membrane Potential of *Penicillium chrysogenum*, Mar. 26, 2000.
Ross, P. et al., Thymidylate Synthase Gene from *Lactococcus lactis* as a Genetic Marker: an Alternative to Antibiotic Resistance Genes, Applied and Environmental Microbiology, p. 2164-2169 (1990).

(Continued)

*Primary Examiner*—David J Steadman
(74) *Attorney, Agent, or Firm*—Hunton & Williams LLP

(57) ABSTRACT

Method of preventing bacteriophage infection of bacterial cultures comprising modified strains, wherein the cultures are completely resistant to bacteriophage attack and have retained their capability of being metabolically active. The method is useful in the manufacturing of food products, feed products or useful metabolite products.

19 Claims, 12 Drawing Sheets

OTHER PUBLICATIONS

Verduyn, C. et al., Effect of Benzoic Acid on Metabolic Fluxes in Yeasts: A Continuous-Culture Study on the Regulation of Respiration and Alcoholic Fermentation, Yeast, vol. 8:501-517 (1992).

Suzuki, I. et al., Growth of *Lactobacillus bulgaricus* in Milk. 1. Cell Elongation and the Role of Formic Acid in Boiled Milk, Journal of Dairy Science, vol. 69, No. 2 (1986).

Richardson, G.H. et al., Proteinase negative Variants of *Streptococcus cremoris* for *cremoris* for cheese starters, Journal of Dairy Science, vol. 66, pp. 2278-2286 (XP-002082743) (1983).

Richardson, G.H. et al., Paired and Single Strain Protease Negative Lactic Streptococci for Cheese Manufacture, Journal of Dairy Science, vol. 67, No. 3, pp. 518-521 (XP-002082744) (1984).

Sands, J. and Auperin, D., Effects of Temperature and Host Cell Genetic Characteristics on the Replication of the Lipid-Containing Bacteriophage PR4 in *Escherichia coli*, Journal of Virology, vol. 22, No. 2, pp. 315-320 (1977).

Morishita, T. et al., "Multiple Nutritional Requirements of *Lactobacilli*: Genetic Lesions Afffecting Amino Acid Biosynthetic Pathways," *Journal of Bacteriology*, Oct. 1981, pp. 64-71, vol. 148.

\* cited by examiner

METHOD OF PREVENTING BACTERIOPHAGE INFECTION OF BACTERIAL CULTURES

CROSS-REFERENCE TO RELATED APPLICATIONS

This application is a national phase of PCT Application, PCT/DK99/00382, filed Jul. 2, 1999 which was published in English on Jan. 13, 2000. This application claims priority from Denmark patent application PA 1998 00878 of Jul. 3, 1998 and U.S. Provisional Patent application 60/091,735 of Jul. 6, 1998. The contents of all the above-identified patent applications are incorporated herein by reference to the extent they are consistent with this application and the inventions described herein.

The sequence listing in the file named "54337o000009.txt" having a size of 2,006 bytes that was created Dec. 15, 2009 is hereby incorporated by reference in its entirety.

FIELD OF INVENTION

The present invention relates to the field of bacterial cultures which are used industrially in the manufacturing of e.g. food products or useful metabolite products. In particular there is provided modified bacterial strains, which, when cultivated in a selected substrate material, are not susceptible to attack by bacteriophages, and have retained their capability of being metabolically active.

TECHNICAL BACKGROUND AND PRIOR ART

Production failures of bacterial cultures caused by bacteriophage infection are considered to be one of the major problems in industrial use of bacterial cultures. Bacteriophages have been found for many of the bacterial strains used in the industry, such as species of lactic acid bacteria e.g. *Lactococcus* spp., *Lactobacillus* spp., *Leuconostoc* spp., *Pediococcus* spp., and *Streptococcus* spp., *Propionibacterium* spp., *Bifidobacterium* spp, *Staphylococcus* spp. or *Micrococcus* spp. Furthermore, bacteriophage infections are also well known in other industrially useful species such as *Bacillus* spp., *Enterobacteriaceae* spp. including *E. coli*, *Corynebacterium* spp. *Actinomycetes* spp. and *Brevibacterium* spp.

In the food industry lactic acid bacterial starter cultures are widely used for food fermentations. It appears that among members of the lactic acid bacteria *Lactococcus* spp. are most devastated by bacteriophage infections. A factor, which leads to frequent bacteriophage infections in lactic acid bacterial starter cultures is the fact that the fermentation conditions in the food industry including the dairy industry are generally non-sterile. Thus, it has not yet been possible to eliminate bacteriophage contamination under these industrial conditions.

The lytic development of phages involves adsorption of the phages to the host cell surface, injection of phage DNA into the cell, synthesis of phage proteins, replication of phage DNA, assembly of progeny phages and release of progeny from the host. Cell-mediated mechanisms of interference with any of these events can prevent a phage infection. The ability of bacterial cultures to resist bacteriophage infection during industrial use depends to a large extent on host strain characteristics affecting one or more of the above mechanisms.

Thus, it has been shown that natural bacteriophage resistance or defense mechanisms exist in bacterial strains which ensure a certain level of protection against bacteriophage attack. These natural defense mechanisms include phage adsorption inhibition, prevention of phage DNA penetration, restriction of phage DNA and abortive infection.

The prevention of productive contact between phages and bacterial cells due to altered cell surface receptors for phages greatly reduces the ability of the phages to attack the cells. Adsorption of the phages to the cell surface is not always sufficient for the translocation of the phage DNA. It has been shown that host specific cell membrane proteins are involved in the prevention of phage DNA penetration.

Restriction/modification is a mechanism that operates by the cooperation of two enzyme systems, a DNA-cleaving restriction enzyme and a DNA-modifying enzyme, usually a methylase. The mechanism functions by cleaving the phage DNA, as it enters the cell.

Abortive phage infection is described as a mechanism that interferes with the phage development after phage expression has begun. This may eventually lead to a reduced level or termination of the production of viable phage progeny.

However, like many other traits of bacterial strains which are important for industrial performance, the above described natural phage defense mechanisms have been shown to be unstable characteristics, as they may be mediated by plasmids. Furthermore, these defense mechanisms are often phage specific, i.e. they are only active against a limited range of bacteriophage types. Accordingly, the prior art is not aware of a general and stably maintained host cell associated resistance mechanism against bacteriophage infection.

Based on the above natural defense mechanisms, the industry has designed and implemented strategies to possibly reduce bacteriophage infection of bacterial cultures including starter cultures for the fermentation of dairy products. Currently used strategies include the use of mixed starter cultures and alternate use of strains having different phage susceptibility profiles (strain rotation).

Traditionally, starter cultures in the dairy industry are mixtures of lactic acid bacterial strains. The complex composition of mixed starter cultures ensures that a certain level of resistance to phage attack is present. However, repeated subculturing of mixed strain cultures leads to unpredictable changes in the distribution of individual strains and eventually undesired strain dominance. This in turn may lead to increased susceptibility to phage attack and risk of fermentation failures.

Rotation of selected bacterial strains which are sensitive to different phages is another approach to limit phage development. However, it is difficult and cumbersome to identify and select a sufficient number of strains having different phage type profiles to provide an efficient and reliable rotation program. In addition, the continuous use of strains requires careful monitoring for new infectious phages and the need to quickly substitute a strain which is infected by the new bacteriophage by a phage resistant strain. In manufacturing plants where large quantities of bulk starter cultures are made ahead of time, such a quick response is usually not possible.

Studies have shown that a reduced growth capacity of a bacterial culture such as a proteinase-deficient lactic acid bacterium results in reduced phage proliferation (Richardson et al., 1983, 1984). However, such bacterial strains are still growing and are thus still susceptible to attack by phages.

Thus, the industry is not in the possession of any reliable strategy to secure that bacterial cultures used for industrial manufacturing of food products or other products are resistant against attack by bacteriophages. Furthermore, none of the currently used strategies prevent infections by any type of bacteriophages and none of these strategies are capable of precluding that bacteriophages, by a mutational event, circumvent the resistance mechanisms of the bacterial culture strains.

It is therefore a significant objective of the present invention to provide a method of preventing bacteriophage infection of bacterial cultures which are used in the manufacturing of food products and other products, wherein the cultures are completely resistant to attack by all types of bacteriophages.

SUMMARY OF THE INVENTION

Accordingly, the invention provides in a first aspect a method of modifying a substrate material by means of a bacterial culture which is capable of being metabolically active in said substrate, whereby the bacterial culture is not susceptible to attack by bacteriophages, the method comprising (i) isolating a bacterial strain which is not capable of DNA replication, RNA transcription or protein synthesis in said substrate material but is capable of metabolically modifying the substrate material, (ii) propagating the selected strain in a medium wherein the strain is capable of replicating to obtain a culture of said strain, (iii) adding the thus obtained bacterial culture to the substrate material and keeping the material under conditions where the culture is metabolically active, whereby, if the substrate material is contaminated with a bacteriophage, the metabolic activity of the bacterial culture is substantially unaffected by the bacteriophage.

The invention pertains in another aspect to a modified lactic acid bacterium that is modified to become incapable of performing DNA replication, RNA transcription or protein synthesis in a specifically defined substrate material which is limited with respect to at least one compound that is required by the bacterial strain for DNA replication, RNA transcription or protein synthesis, said modified bacterial strain is capable of being metabolically active in said substrate material, whereby the strain is not susceptible to attack by bacteriophages, subject to the limitation, that the lactic acid bacterium is not strain DN105 (DSM12289).

In further aspects, there is provided a starter culture compostion comprising the lactic acid bacterium according to the invention and a starter culture compostion comprising a lactic acid bacterium obtainable by the method according to the invention in combination with at least one further lactic acid bacterium.

In a further aspect, there is provided a method of manufacturing a food or feed product comprising adding a starter culture composition according to the invention to a food or feed product starting material and keeping the thus inoculated starting material under conditions where the lactic acid bacterium is metabolically active.

The invention relates in a further aspect to a method of preventing that a lactic acid bacterial starter culture is infected by bacteriophages in the manufacturing of a food or feed product, the method comprising adding as a starter culture a lactic acid bacterium obtained by the method according to the invention to a food or feed product starting material which is limited with respect to at least one compound that is required by the bacterial strain for DNA replication, RNA transcription or protein synthesis and keeping the thus inoculated starting material under conditions where the lactic acid bacterium is metabolically active, whereby, if the substrate material is contaminated with a bacteriophage, the metabolic activity of the bacterial culture is substantially unaffected by the bacteriophage.

In a still further aspect, the invention pertains to the use of a culture as obtained in the method of the invention or a lactic acid bacterium according to the invention as a starter culture in the preparation of a product selected from the group consisting of a dairy flavour, a product for cheese flavouring, a food product and a feed product.

DETAILED DISCLOSURE OF THE INVENTION

Thus, in its broadest aspect the invention provides a method of modifying a substrate material by means of a bacterial culture which is capable of being metabolically active in said substrate, whereby the bacterial culture is not susceptible to attack by bacteriophages, said method comprising the steps (i) to (iii) as mentioned above. As used herein, the expression "modifying a substrate material" is used interchangeably with the term "fermentation" and relates to any aerobic or anaerobic breakdown of organic compounds by a bacterial culture with the production of an end product. In addition, it will be appreciated that the expression "metabolically active" refers to the capability of the bacterial culture to convert a substrate material such as e.g. milk or a sugar.

In the present context, the expression "not susceptible to attack by bacteriophages" includes the capability of a host cell to be metabolically active even though a bacteriophage adsorbs to the host cell surface and injects its DNA into the host cell. As used herein, the term "bacteriophages" referres to any kind of virus that infects bacteria, including the group of prolate headed bacteriophages, isometric headed bacteriophages and group P335 of bacteriophages.

In accordance with the invention, the method comprises in one aspect the isolation of a bacterial strain which is not capable of DNA replication, RNA transcription or protein synthesis in a specifically defined substrate material, but is capable of metabolically modifying said material. It will be understood that in this context the expression "a specifically defined substrate material" referres to substrate material which is limited with respect to at least one nutrient compound that is required by the bacterial strain for DNA replication, RNA transcription or protein synthesis. Evidently, it was a very surprising finding that it is possible to provide such non-proliferating bacterial strains which are unable to grow in specifically defined substrate materials, but which have retained their capability of being metabolically active. As used herein, the expression "non-proliferating bacterial strain" relates to a bacterial strain which is incapable of multiplying in a specifically defined substrate material.

In a particularly useful embodiment of the present invention the above specific substrate material is limited with respect to at least one nutrient compound that is required by the bacterial strain for DNA replication, RNA transcription or protein synthesis. Such compounds include amino acids or nitrogenous bases such as purine and pyrimidine bases.

Thus, the growth of the bacterial strain is prevented due to the lack of capability of the strains to synthesize the specific compound with respect to which the substrate is limited. Such a mutant strain which has lost the capability of de novo synthesising such essentially compounds is also referred to in the art as an "auxotrophic strain". Therefore, in preferred embodiments, the bacterial strain is a mutant strain being auxothrophic in respect of a compound which is not present in the substrate material and which is required by the strain for DNA replication, RNA transcription or protein synthesis.

The substrate material used in the method of the invention may in a further useful embodiment contain at least one compound that inhibits the DNA replication, RNA transcription or the protein synthesis of the bacterial strain. Examples of such compounds include chloramphenicol and erythromycin which affect the ribosomes of the bacterial cell and thus inhibit protein synthesis.

In accordance with the invention, the propagation of the selected strain prior to its use in the present method requires a medium wherein the strain is capable of replicating to obtain a culture of said strain. It is assumed that a medium containing the specific compound which the mutant is unable to synthesize, will restore the capability of the mutant to grow, i.e. capability of DNA replication, RNA transcription and/or protein synthesis.

In a further step of the method according to the invention, the above obtained bacterial culture is added to the above substrate material and kept under conditions where the culture is metabolically active. It will be understood that in this context, the term "conditions" includes the temperature, pH, appropriate composition of the substrate material or presence/absence of an inducer substance, at which the metabolic activity of the bacterial culture is optimal.

Bacteriophages require hosts with intact DNA replication, RNA transcription and protein synthesis in order to become proliferated. Accordingly, bacterial cultures used in the method of the invention are incapable of performing one of the above activities, which makes such bacterial cultures substantially completely resistant to attack by bacteriophages. Thus, the metabolic activity of the bacterial culture is substantially unaffected even if the substrate material is contaminated with bacteriophages. As used herein, the expression "substantially unaffected" indicates that by using conventional detection methods no changes or only minor changes in the metabolic activity can be detected.

It will be appreciated that such auxotrophic bacteria can be provided by subjecting a wild type bacterial strain that, under appropriate conditions, is capable of growing in a substrate material with or without a specific compound needed for DNA replication, RNA transcription or protein synthesis to a mutagenization treatment and selecting a strain that is substantially incapable of growing in the absence of said specific compound.

Suitable mutagens include conventional chemical mutagens and UV light. Thus, as examples, a chemical mutagen can be selected from (i) a mutagen that associates with or becomes incorporated into DNA such as a base analogue, e.g. 2-aminopurine or an interchelating agent such as ICR-191, (ii) a mutagen that reacts with the DNA including alkylating agents such as nitrosoguanidine or hydroxylamine, or ethane methyl sulphonate (EMS).

As an alternative, auxotrophic bacteria can be provided by selecting spontaneously occurring mutants which, compared to the parent strain, has a growth requirement for a compound needed for DNA replication, RNA transcription or protein synthesis.

It will be understood that it is also possible to provide an auxotrophic mutant by site-directed mutagenesis, e.g. by using recombinant DNA techniques, such as gene knock-out techniques, by which the specific gene is disrupted and rendered non-functional in the bacterium. It is also possible to construct the mutated bacterial strains according to the method of the present invention by techniques which involve the loss of part of the chromosome or a nucleotide base or bases in the DNA sequence which renders the specific gene non-functional in the bacterium. An illustrative example of such a deletion strategy is described in details in the below Examples.

The above bacterial wild type parent strain can be selected from any industrially suitable bacterial species, i.e. the strain can be selected from the group consisting of *Lactococcus* spp. including *L. lactis, Lactobacillus* spp., *Leuconostoc* spp., *Pediococcus* spp., *Streptococcus* spp., *Propionibacterium* spp., *Bifidobacterium* spp., *Staphylococcus* spp., *Micrococcus* spp., *Bacillus* spp., *Actinomycetes* spp., *Enterobacteriaceae* spp. including *E. coli, Corynebacterium* spp. and *Brevibacterium* spp.

In one specific embodiment of the method according to the invention, a Pur⁻ mutant, including the *Lactococcus lactis* strain DN105 (DSM 12289), is used. This acidifying bacterial strain DN105 is a purine auxotrophic mutant capable of acidifying milk, even though the strain is not capable of growth because of its requirement for purine, which is not present in milk in sufficient amounts to support growth of such a bacterium. As it is shown in the below Example 1, strain DN105 is capable of acidifying milk under purine starvation conditions even in the presence of a high concentration of bacteriophages.

In a further useful embodiment of the method according to the invention, a thyA mutant, including the *Lactococcus lactis* strain MBP71 (DSM12891), is used. This acidifying bacterial strain MBP71 is a thymidine auxotrophic mutant, which is capable of acidifying milk, even though the strain is not capable of growth, due to its requirement for thymidine, which is not present in milk in sufficient amounts to support growth of such a mutant. As shown in Example 2 below, strain MBP71 is capable of acidifying milk under thymidine starvation conditions even in the presence of a high concentration of bacteriophages.

It is convenient to provide the above bacterial strains both when used as a food or feed production strain and as a production strain for metabolites, as a composition comprising the bacterial strain selected for the specific use. Typically, such compositions contain the bacterium in concentrated form e.g. at a concentration of viable cells (colony forming units, CFUs) which is in the range of $10^5$ to $10^{13}$ per g of the composition such as in the range of $10^6$ to $10^{12}$ per g. Additionally, the culture composition may contain further components such as bacterial nutrients, cryoprotectants or other substances enhancing the viability of the bacterial active ingredient during storage. The composition can e.g. be in the form of a liquid, frozen or a freeze-dried composition.

As mentioned above, one characteristic of the bacterial culture as used in the method of the invention, is that it is capable of metabolically modifying a specifically defined substrate material even though the strain is incapable of growth in such substrate. When a lactic acid bacterium is used in the method of the invention, the obtained bacterial culture typically has an acidification rate in milk which is at least 10% of that of said culture when it is present in a substrate material where it is capable of DNA replication, RNA transcription and/or protein synthesis. In preferred embodiments, the bacterial strain has an acidification rate in milk which is at least 1% including at least 5%, such as at least 10%, e.g. at least 15%, such as at least 20%, including at least 25% of that of the culture when it is present in a substrate material where it is capable of DNA replication, RNA transcription and/or protein synthesis.

Typically, the bacterial strain used in the method of the invention is added to the substrate material at a concentration in the range of $10^5$ to $10^9$ CFU/ml or g of the material, such as at least $10^5$ CFU/ml or g of the material, including at least $10^6$ CFU/ml or g of the material, such as at least 10⁷ CFU/ml or g of the material, e.g. at least 10⁸ CFU/ml or g of the material, including at least 10⁹ CFU/ml or g of the material.

Thus, the obtainment of a bacterial culture which is completely resistant to bacteriophage attack according to the method of the invention, can be utilized in all industrial contexts where proliferation of the culture in the substrate material is not a requirement. Dairy fermentations of milk is such an example of an industrial manufacturing process, as proliferation of the lactic acid bacteria during milk fermentation is not a requirement, if the desired taste and acidification of the fermentation product are obtained. Therefore, in useful embodiments, the substrate material is a starting material for an edible product including milk, a vegetable material, a meat product, a must, a fruit juice, a wine, a dough and a batter.

In further embodiments, the substrate material is a starting material for an animal feed such as silage e.g. grass, cereal material, peas, alfalfa or sugar-beet leaf, where bacterial cultures are inoculated in the feed crop to be ensiled in order to obtain a preservation hereof, or in protein rich animal waste products such as slaughtering offal and fish offal, also with the aims of preserving this offal for animal feeding purposes.

Yet another significant application of the method according to the present invention is the use of the bacterial cultures as so-called probiotics. By the term "probiotic" is in the present context understood a microbial culture which, when ingested in the form of viable cells by humans or animals, confers an improved health condition, e.g. by suppressing harmful microorganisms in the gastrointestinal tract, by enhancing the immune system or by contributing to the digestion of nutrients.

It is, as mentioned above, an important objective of the present invention to provide a method of preventing bacteriophage infection of bacterial cultures which are metabolically active by using non-proliferating bacterial cells. In order to be of industrial interest, such metabolic activity should result in the production of a substantial amount of the desired end product. Thus, one possibility of increasing such production by use of a non-proliferating cell is an enhancement of the flux through metabolic pathways.

Accordingly, in one useful embodiment, the bacterial culture used in the method of the invention comprises a genetically modified strain which, relative to its parent strain, is enhanced in at least one metabolic pathway. Such enhanced metabolic activity can e.g. be obtained through an enhanced glycolytic pathway and/or an enhanced flux through the pentose phosphate pathway.

One approach for stimulating the flux through the glycolytic pathway is by increasing the expression of ATPase activity, i.e. an enhanced conversion of ATP to ADP, as described in WO 98/10089. Thus, in one useful embodiment of the invention, the genetically modified strain has, relative to its parent strain, an enhanced ATPase activity.

In one interesting embodiment of the present invention, the genetically modified strain is one wherein the gene coding for an ATPase is under the control of a regulatable promoter. As used herein, the term "regulatable promoter" is used to describe a promoter sequence possibly including regulatory sequences for the promoter, which promoter is regulatable by one or more factors present in the environment of the strain. Such factors include the pH of the growth medium, the growth temperature, a temperature shift eliciting the expression of heat shock genes, the composition of the growth medium including the ionic strength/NaCl content and the growth phase/growth rate of the bacterium. Such a regulatable promoter may be the native promoter or it may be an inserted promoter not naturally related to the gene either isolated from the same bacterial species or it may be a heterologous promoter sequence, i.e. a sequence derived from different bacterial species.

Cells such as "resting cells" or "non-dividing cells" represent other types of non-proliferating cells which are useful in the method of the invention and wherein the above enhancement of the flux through the metabolic pathways is useful. Such cells are incapable of mitosis or meiosis e.g. due to the deficiency of DNA, RNA and/or protein needed for the separation of the cell. Thus, in a particularly useful embodiment, the bacterial culture is one which comprises a bacterial strain which is capable of increasing the size of the cells without mitosis.

In addition, the invention encompasses non-proliferating strains which under specific conditions are incapable of growth. Thus, in an interesting embodiment, the bacterial culture comprises a strain which is a conditional mutant, i.e. a mutant which under predetermined conditions does not perform at least one activity selected from the group consisting of DNA replication, RNA transcription and protein synthesis. Such predetermined conditions include pH, temperature, composition of the substrate material and presence/absence of inducer substances.

One possible means of providing such conditional mutants which are temperature-sensitive is by subjecting a bacterial strain that under appropriate conditions is capable of growing in a substrate material e.g. at a temperature below 30° C. to a mutagenization treatment and selecting a mutant strain that is substantially incapable of growth at temperatures below 30° C., but is capable of growth at higher temperatures.

In a further aspect of the invention there is provided a modified lactic acid bacterium that is modified to become incapable of performing DNA replication, RNA transcription or protein synthesis in a specifically defined substrate material which is limited with respect to at least one compound that is required by the bacterial strain for DNA replication, RNA transcription or protein synthesis, said modified bacterial strain is capable of being metabolically active in said substrate material, whereby the strain is not susceptible to attack by bacteriophages, subject to the limitation, that the lactic acid bacterium is not strain DN105 (DSM12289).

In useful embodiments, the lactic acid bacterium according to the invention is a mutant strain being auxothrophic in respect of a compound which is not present in the substrate material and which is required by the strain for replication.

Presently preferred lactic acid bacteria according to the invention are mutant strains which are thyA mutants including *Lactococcus* lactis strain MBP71 deposited under the accession number DSM12891.

The modified lactic acid bacterium according to the invention is useful as a starter culture in the production of food and feed products. Accordingly, in a further important aspect the invention relates to a starter culture composition comprising the lactic acid bacterium according to the invention.

As it is normal in the production of lactic acid bacterial fermentation processes to apply mixed cultures lactic acid bacteria, a composition will in certain embodiments comprise a multiplicity of strains either belonging to the same species or belonging to different species. Accordingly, in a further important aspect, the invention relates to a starter culture composition comprising a lactic acid bacterium obtainable by the method according to the invention in combination with at least one further lactic acid bacterium. A typical example of such a useful combination of lactic acid bacteria in a starter culture composition is a mixture of the bacterium obtainable by the method according to the invention and one or more *Lactococcus* spp. such as *Lactococcus lactis* subsp. *lactis* or Lactococcus lactis subsp. lactis biovar. diacetylactis or Leuconostoc spp. Such a mixed culture can be used in the manufacturing of fermented milk products such as buttermilk and cheese.

In one embodiment, the composition according to the invention, is one which further comprising at least on component enhancing the viability of the bacterial active ingredient during storage including a bacterial nutrient or a cryoprotectant.

It is also an objective of the present invention to provide a method of manufacturing a food or feed product based on the use of the modified bacterium of the invention. Thus, in its broadest aspect, such a method comprises adding a starter culture composition according to the invention to a food or feed product starting material and keeping the thus inoculated starting material under conditions where the lactic acid bacterium is metabolically active. In a particularly useful embodiment, the food product starting material is milk.

In further aspects, the invention relates to the use of a culture as obtained in the method according to the invention as a starter culture in the preparation of a product selected from the group consisting of a dairy flavour, a product for cheese flavouring, a food product and a feed product.

The invention will now be described in further details in the following non-limiting examples and the drawings wherein

EXAMPLE 1

Figure 1:
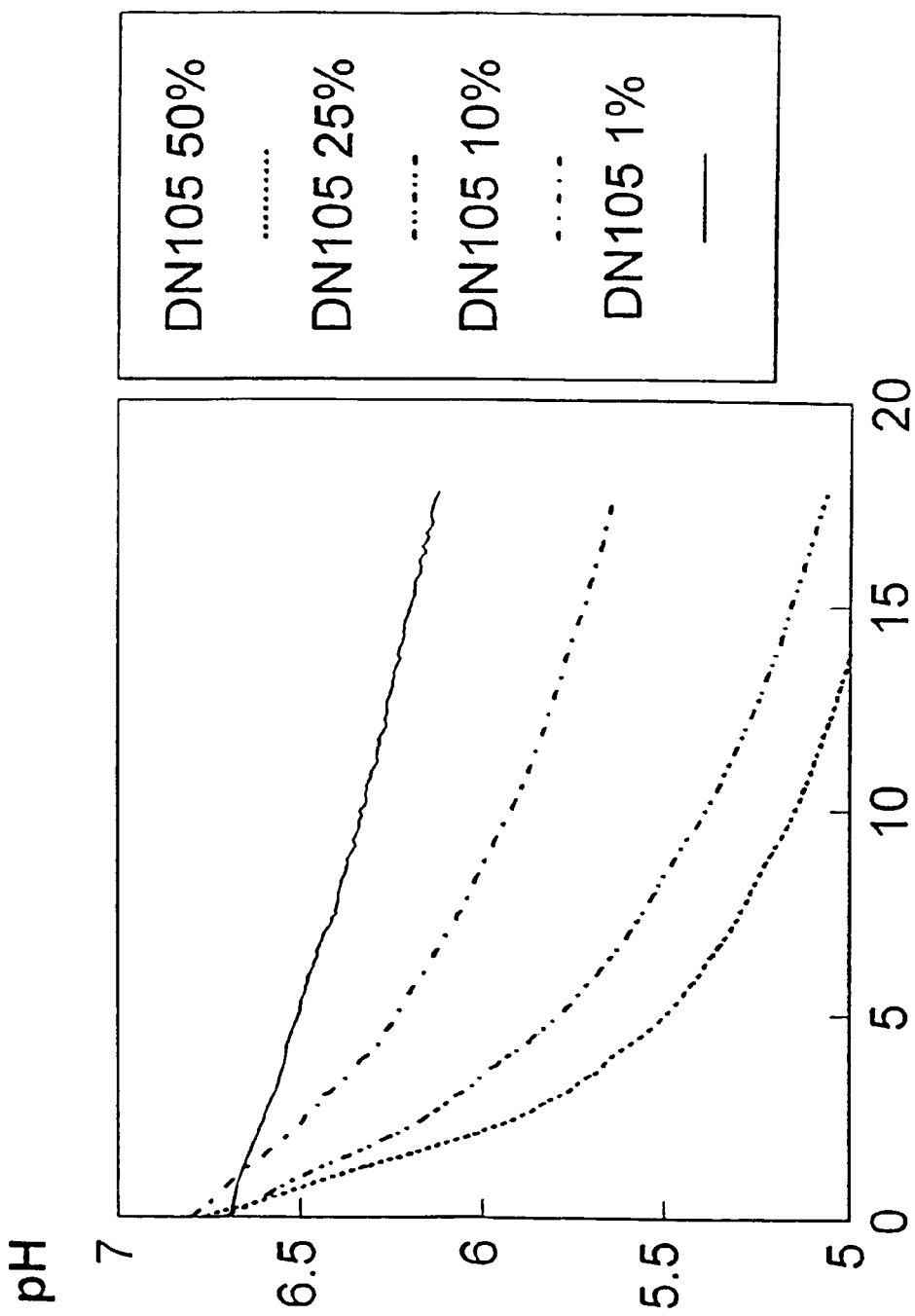
FIG. 1. shows the acidification of reconstituted skim milk (RSM) by strain DN105. The pH was followed over time in RSM cultures containing strain *Lactococcus lactis* DN105 inoculated at 1%, 10%, 25% and 50% vol/vol.

The Use of a Purine Auxotrophic *Lactococcus lactis* Strain for Obtaining Resistance Against Bacteriophages in Milk Fermentations 1.1. Materials and Methods
(i) Bacterial Strains, Media and Growth Conditions The *Lactococcus lactis* strain DN105 is a purine auxotrophic mutant (Pur⁻ derived from the wild type strain CHCC373 described in Nilsson and Lauridsen (1992). A sample of *Lactococcus lactis* strain DN105 is deposited with Deutsche Sammlung von Mikroorganismen and Zellkulturen GmbH, Mascheroder Weg 1b, D-38124 Braunschweig, Germany on 30 Jun. 1998 under the accession No. DSM 12289.

*Lactococcus lactis* was grown in M17 (Terzaghi & Sandine, 1975) in the chemically defined DN medium (Dickely et al., 1995) or in reconstituted skim milk (RSM) containing 9.5% (w/vol) low fat skim milk powder at 30° C. For the propagation of strain DN105, the medium was supplemented with hypoxanthine to a final concentration of 15-50 mg/l. The Pur⁻ phenotype of strain DN105 was tested by its ability to grow on DN medium with and without hypoxanthine supplement.

(ii) Bacteriophages and their Handling

Bacteriophages were purified by three single plaque isolation steps. The high titer bacteriophage lysates were prepared by consecutive infections of the host strain CHCC373 with the bacteriophage at an MOI (multiplicity of infection) of 0.1 to 1.0. After infection the culture was grown at 30° C. in M17 supplemented with 10 mM $CaCl_2$ until completed lysis. The lysates were centrifuged for 15 min at 6.000 rpm and the supernatant sterile filtered (0.45 μm, Schleicher and Schuell).

(iii) Determination of Bacteriophage Titers

For the determination of bacteriophage titers (plaque forming units per ml) the agar double layer method was used (Adams M. H., 1959; Interscience Publishers, Inc., New York). The bacteriophages used for the acidification test are listed in Table 1 below:

TABLE 1

| Bacteriophages and phage titers | |
|---|---|
| Phage | Titer (PFU/ml) |
| CHPC12 | $4 \times 10^{10}$ |
| CHPC412 | $3 \times 10^{10}$ |
| CHPC708 | $2 \times 10^{10}$ |
| CHPC710 | $2 \times 10^{10}$ |
| CHPC783 | $1 \times 10^{11}$ |
| CHPC795 | $7 \times 10^{10}$ |
| CHPC814 | $1 \times 10^{10}$ |
| CHPC836 | $4 \times 10^{10}$ |

(iv) Test for the Acidification of RSM by Strain DN105

10-400 ml of an outgrown culture of strain DN105 in M17 was harvested by centrifugation, washed twice with a sterile solution of 0.9% NaCl to remove residual purine compounds and resuspended in 10-400 ml of RSM to give the same cell density as in the outgrown M17 culture. The resuspended material was used for inoculation of fresh RSM at volume/volume concentrations typically in the range of 10 to 100% (v/v). The pH was monitored either on-line or by measuring the pH of 3 ml samples collected at intervals.

1.2. Results of the Acidification of RSM by *Lactococcus lactis* Strain DN105

In general, lactic acid bacterial cells which do not have intact DNA replication, RNA transcription and protein synthesis systems are unable to grow and acidify milk. Nilsson and Lauridsen (1992) demonstrated that the purine auxotrophic mutant DN105 is unable to grow in a medium without purines. It has also been reported that purine auxotrophic mutants of *Lactococcus lactis* not growing in milk are incapable of acidifying such a substrate material (Dickely et al., 1995). To test the ability of strain DN105 to acidify a milk based medium, the strain was inoculated in varying amounts in RSM as described in Materials and Methods and the pH of the substrate material was monitored (FIG. 1).

The results shown in FIG. 1 clearly demonstrates that strain DN105 was able to acidify milk at least to pH 5.0 even under purine starving conditions.

1.3 Studies of the Bacteriophage Resistance of *Lactococcus lactis* Strain DN105 in RSM As it is generally known, a bacteriophage requires a susceptible host cell which has intact DNA replication, RNA transcription and protein synthesis systems for development. If a potential host is not capable of performing at least one of these activities, bacteriophages cannot be proliferated in the cell.

Figure 2:
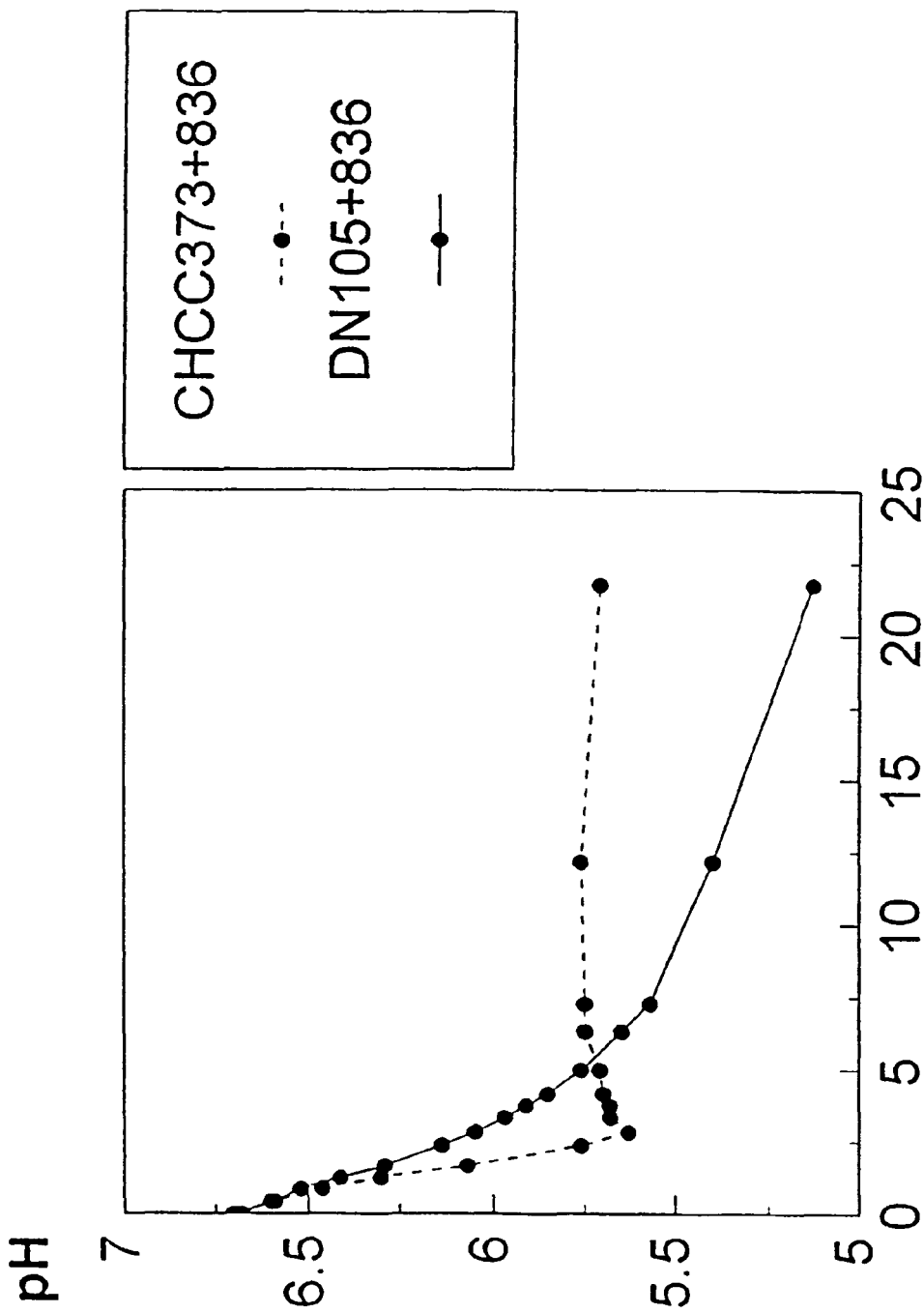
FIG. 2 illustrates the development of pH in RSM when inoculated with 25% vol/vol of *Lactococcus lactis* strain CHCC373 or *Lactococcus lactis* strain DN105, in the presence of the bacteriophage strain 836 at a concentration of at least $10^8$ PFU/ml.
Figure 3A:
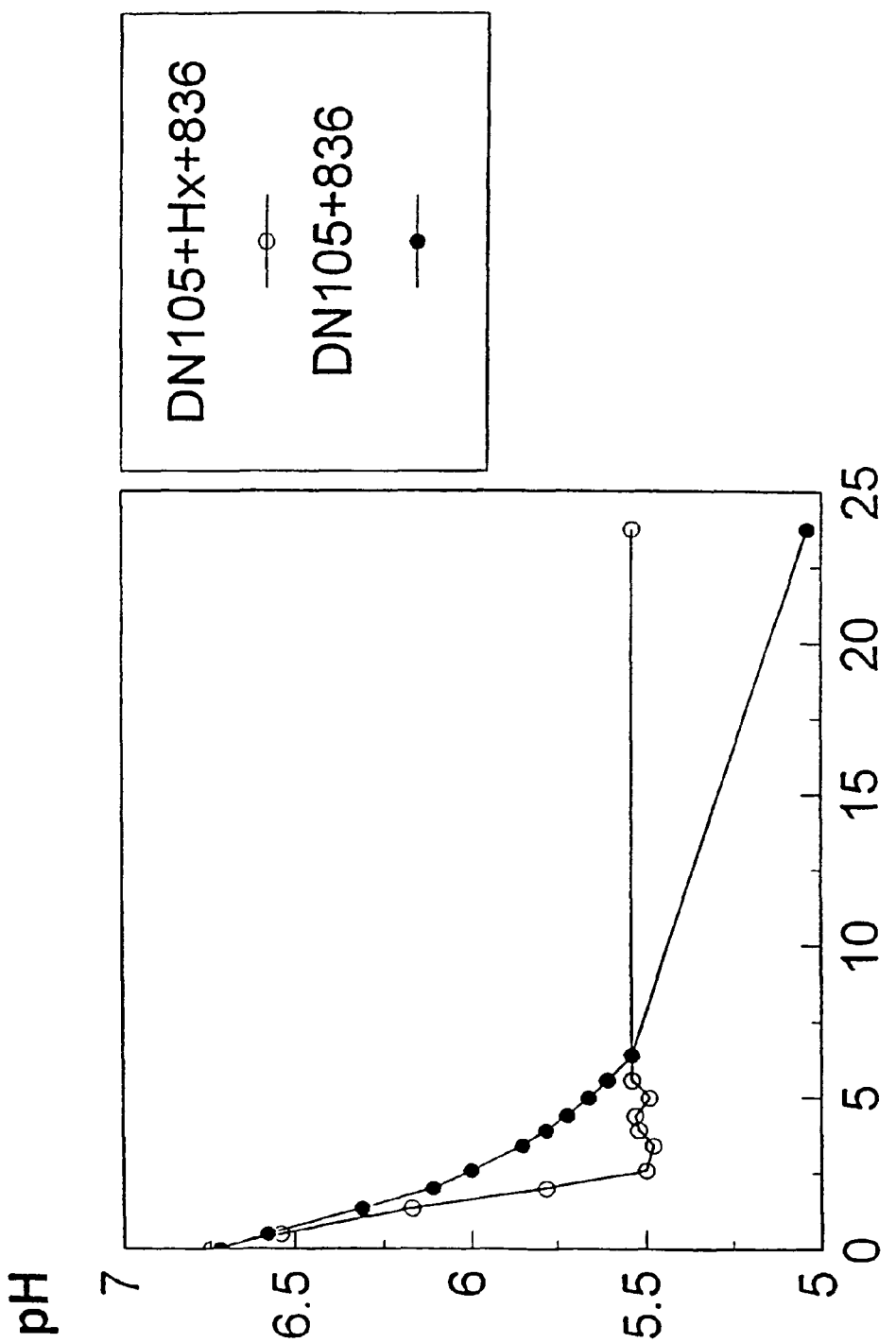
FIGS. 3A-3H illustrate the development of pH in RSM when inoculated with 25% vol/vol of *Lactococcus lactis* strain DN105 with or without addition of the purine compound hypoxanthine to the culture medium, in the presence of at least $10^8$ PFU/ml of the following bacteriophages: CHPC836 (3A); CHPC412 (3B); CHPC783 (3C); CHPC795 (3D); CHPC710 (3E); CHPC12 (3F); CHPC708 (3G); CHPC814 (3H)
Figure 3B:
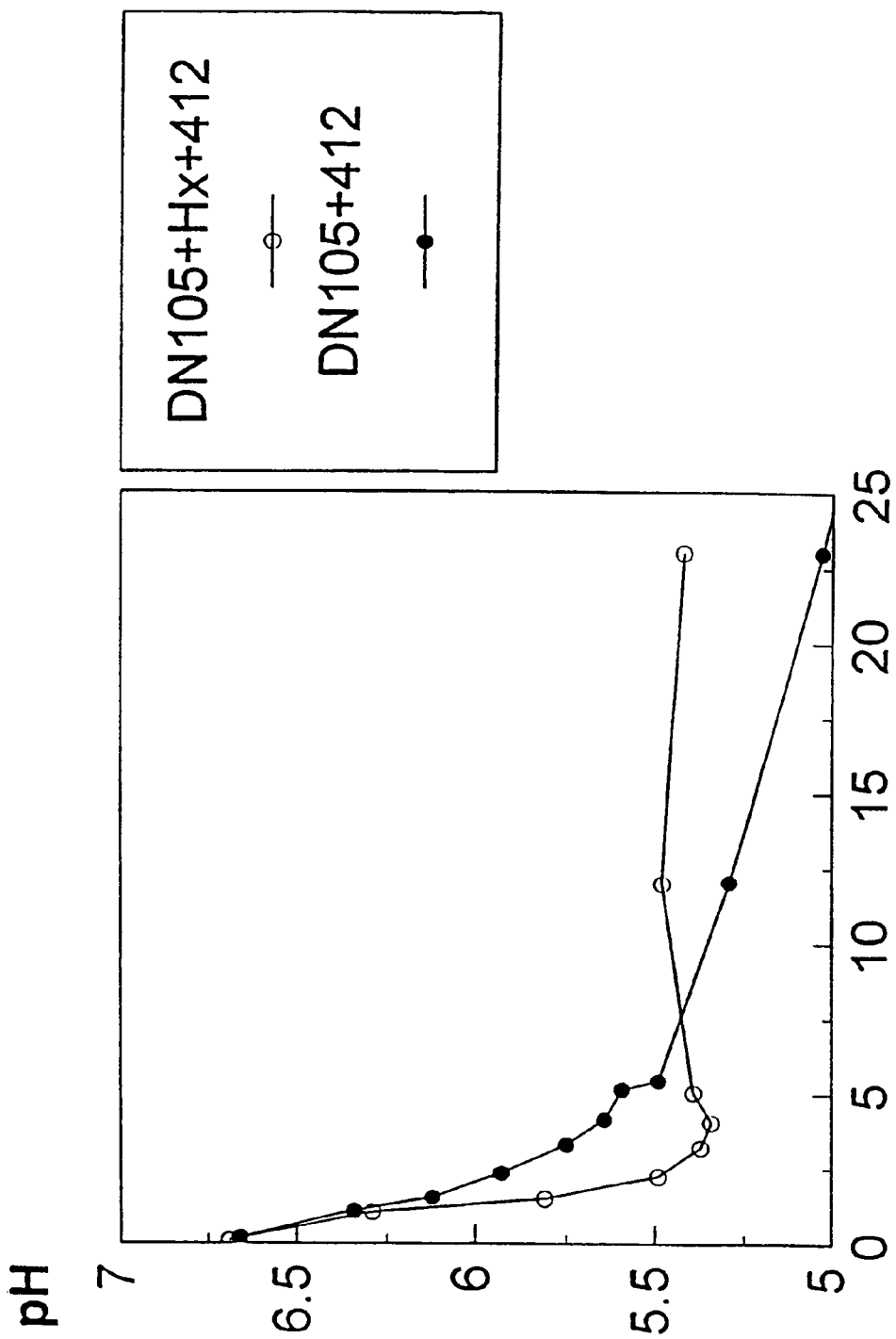
Figure 3C:
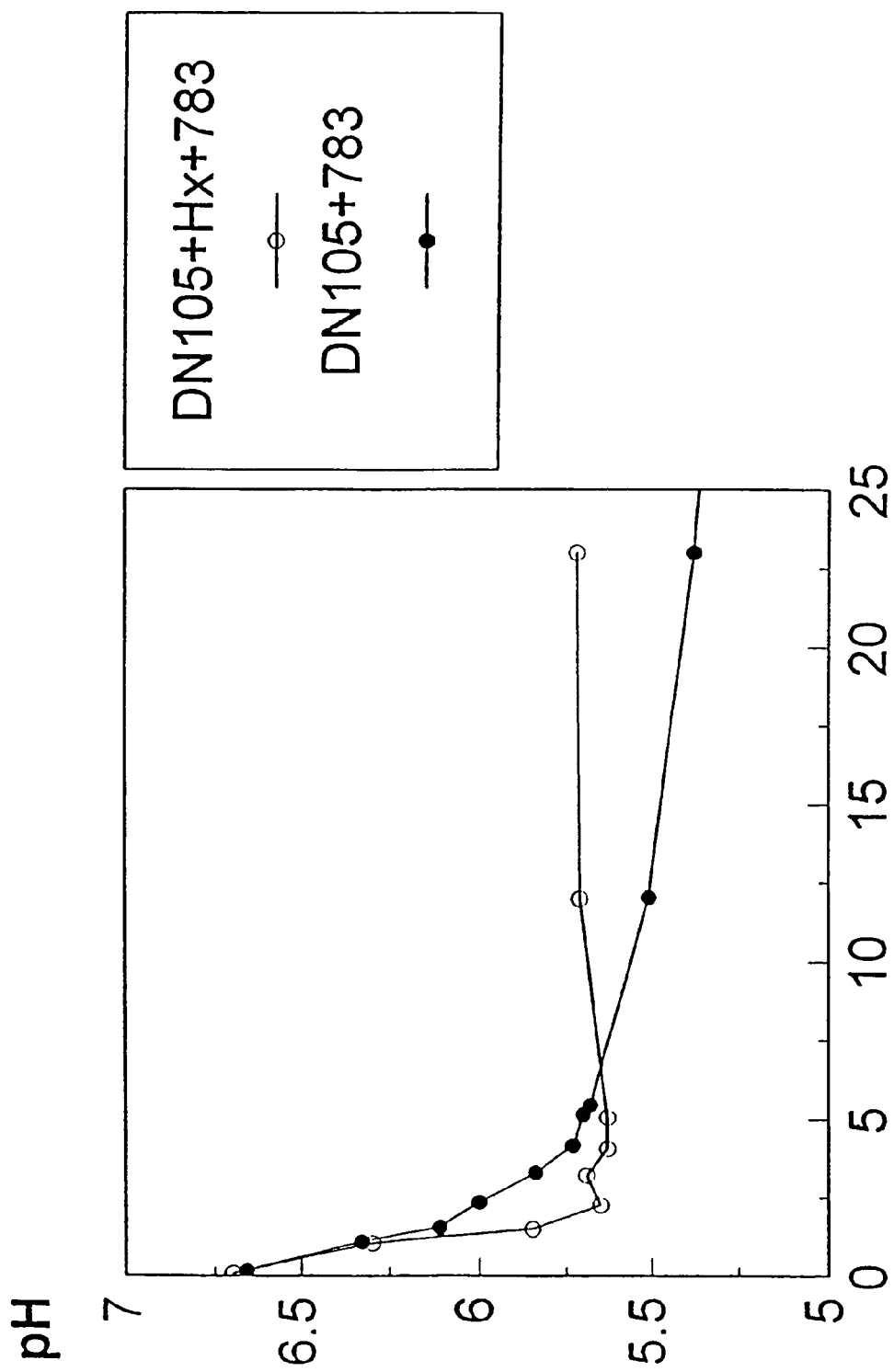
Figure 3D:
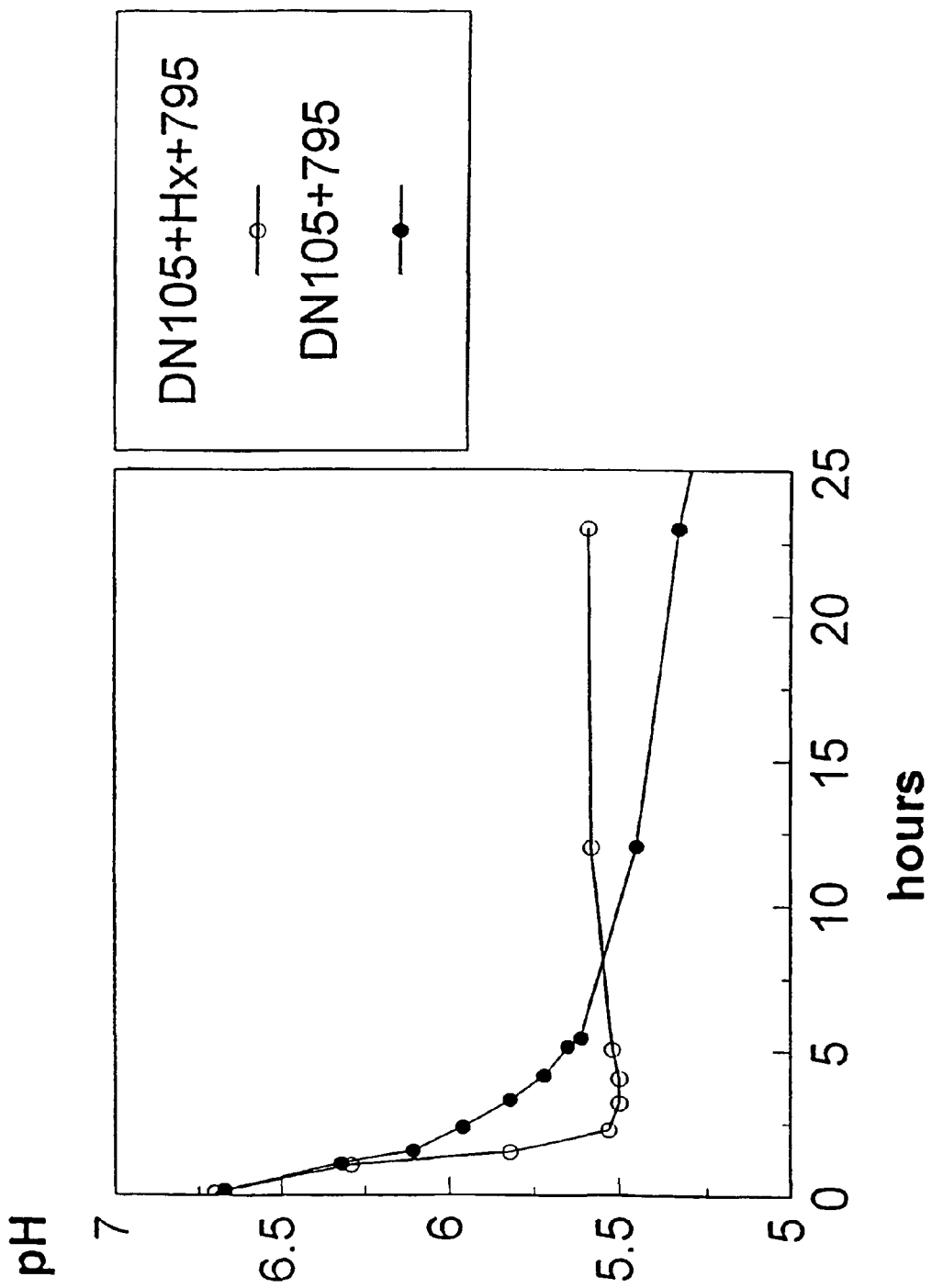
Figure 3E:
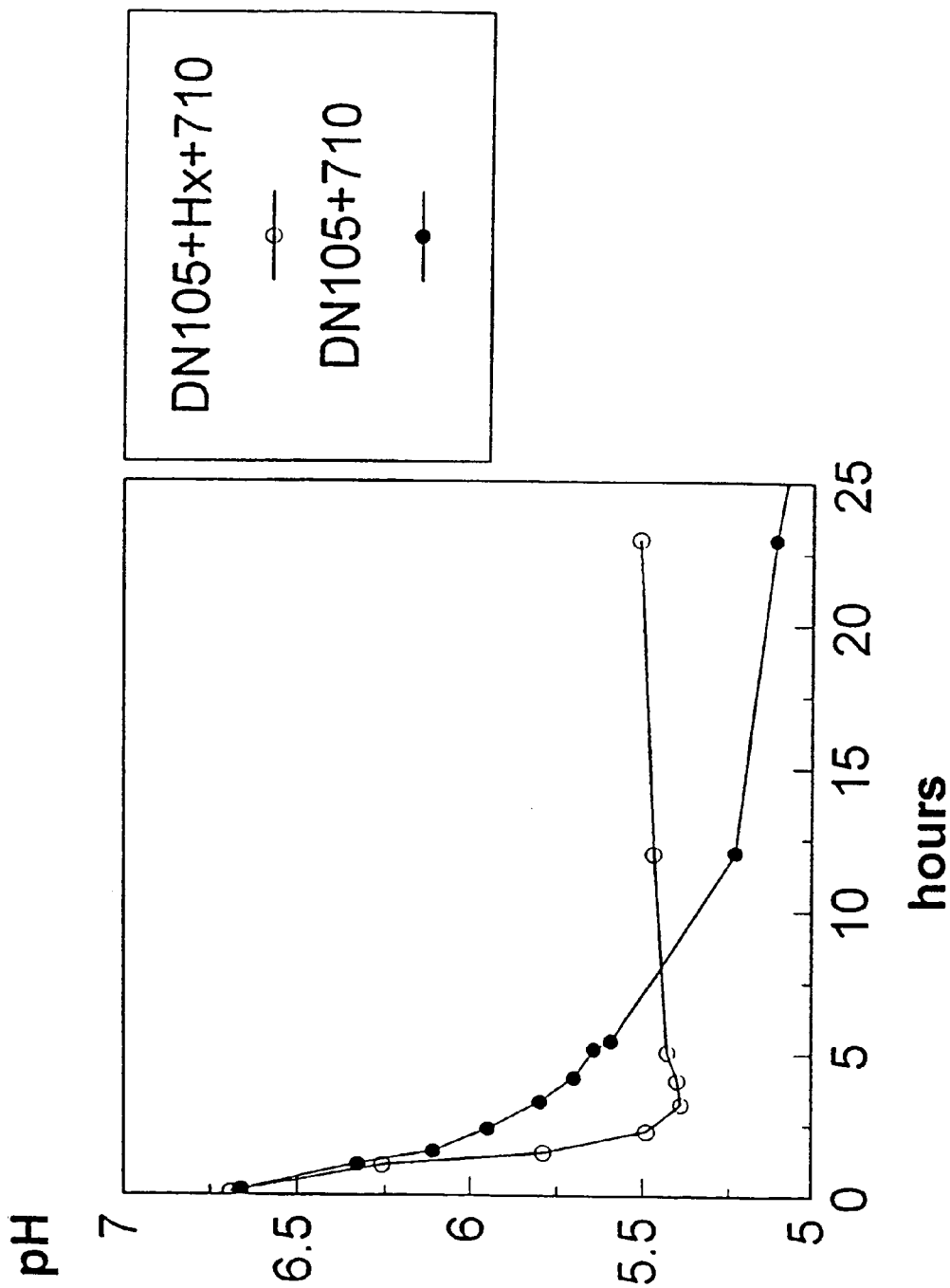
Figure 3F:
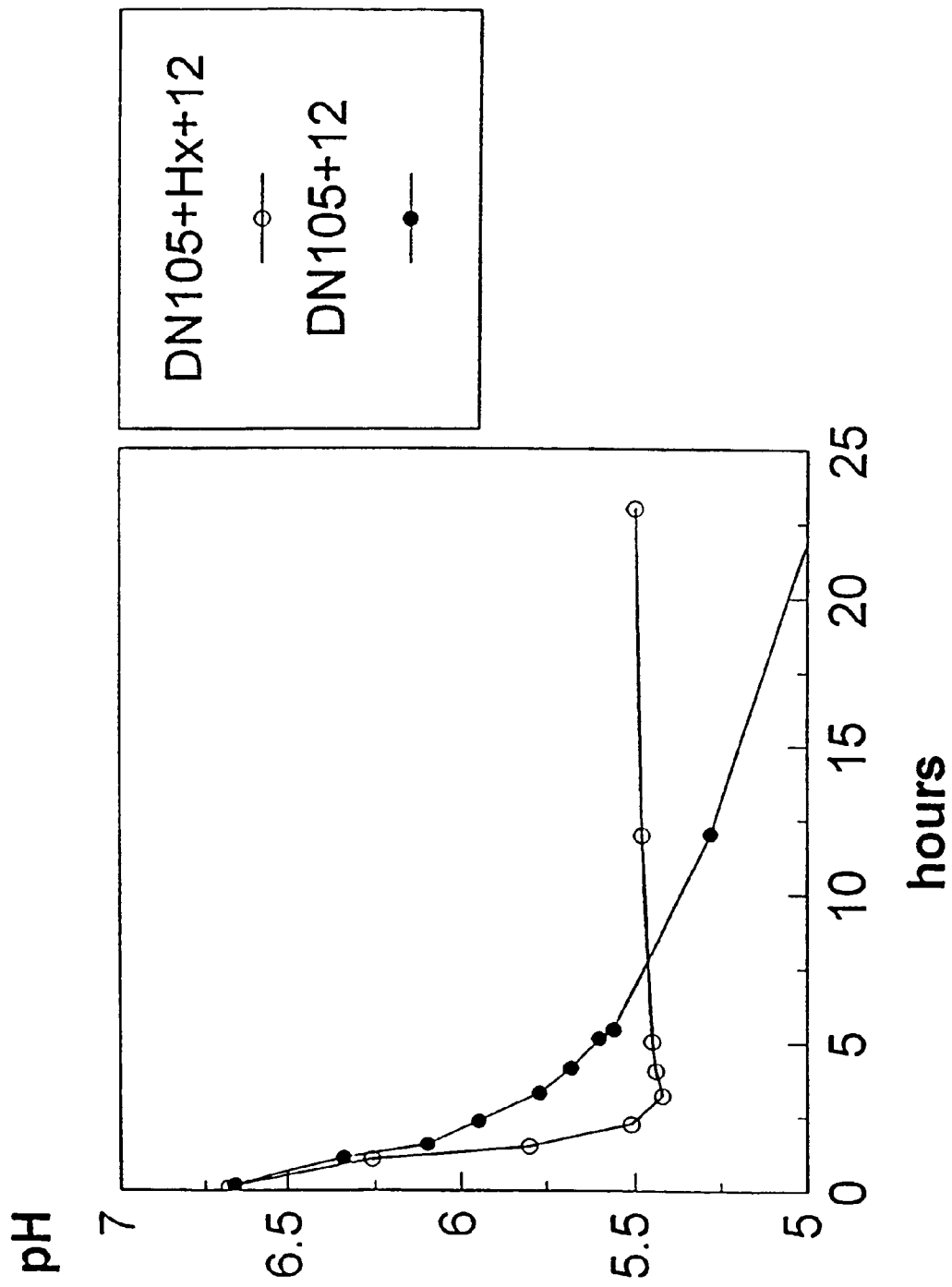
Figure 3G:
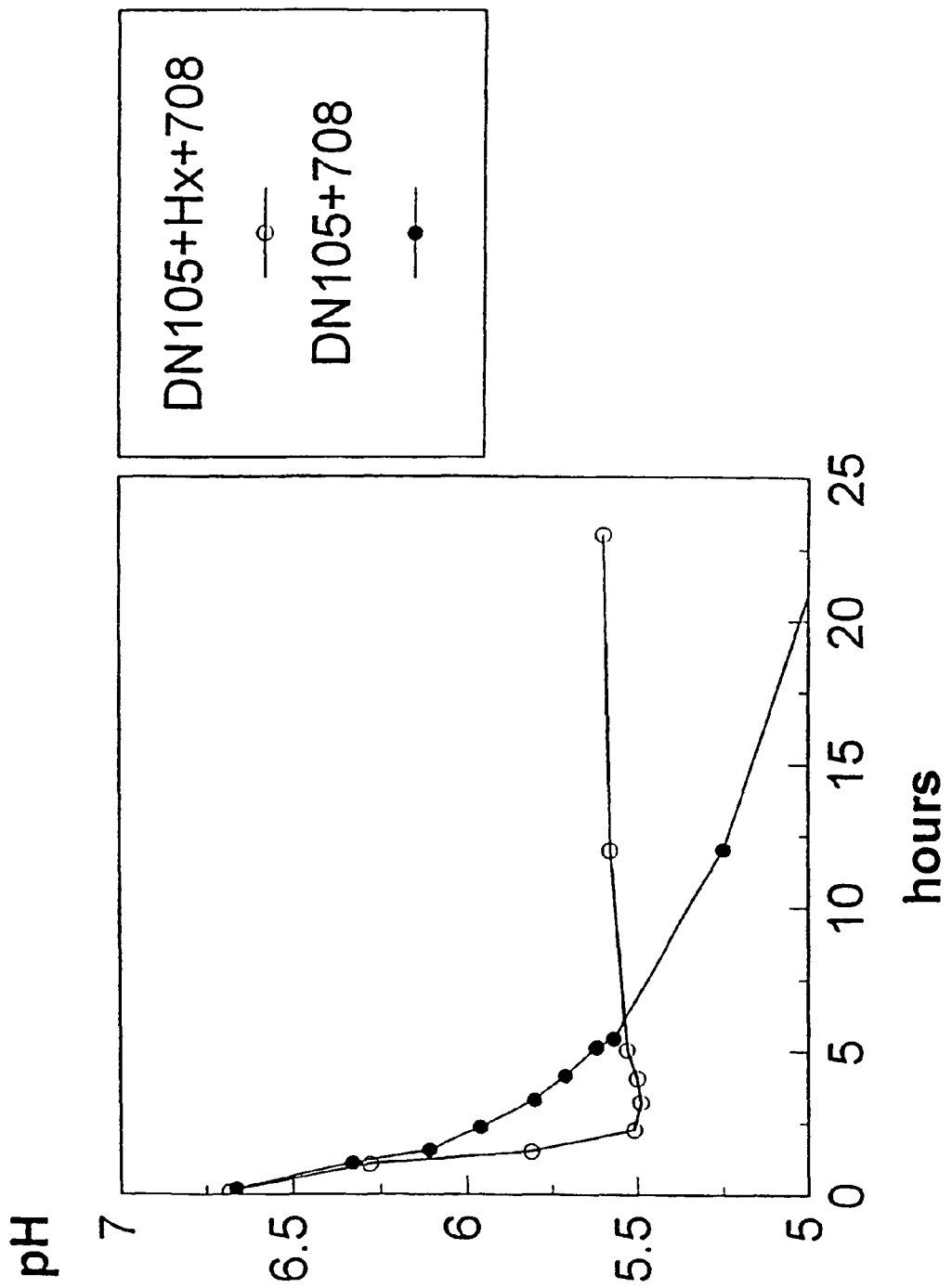
Figure 3H:
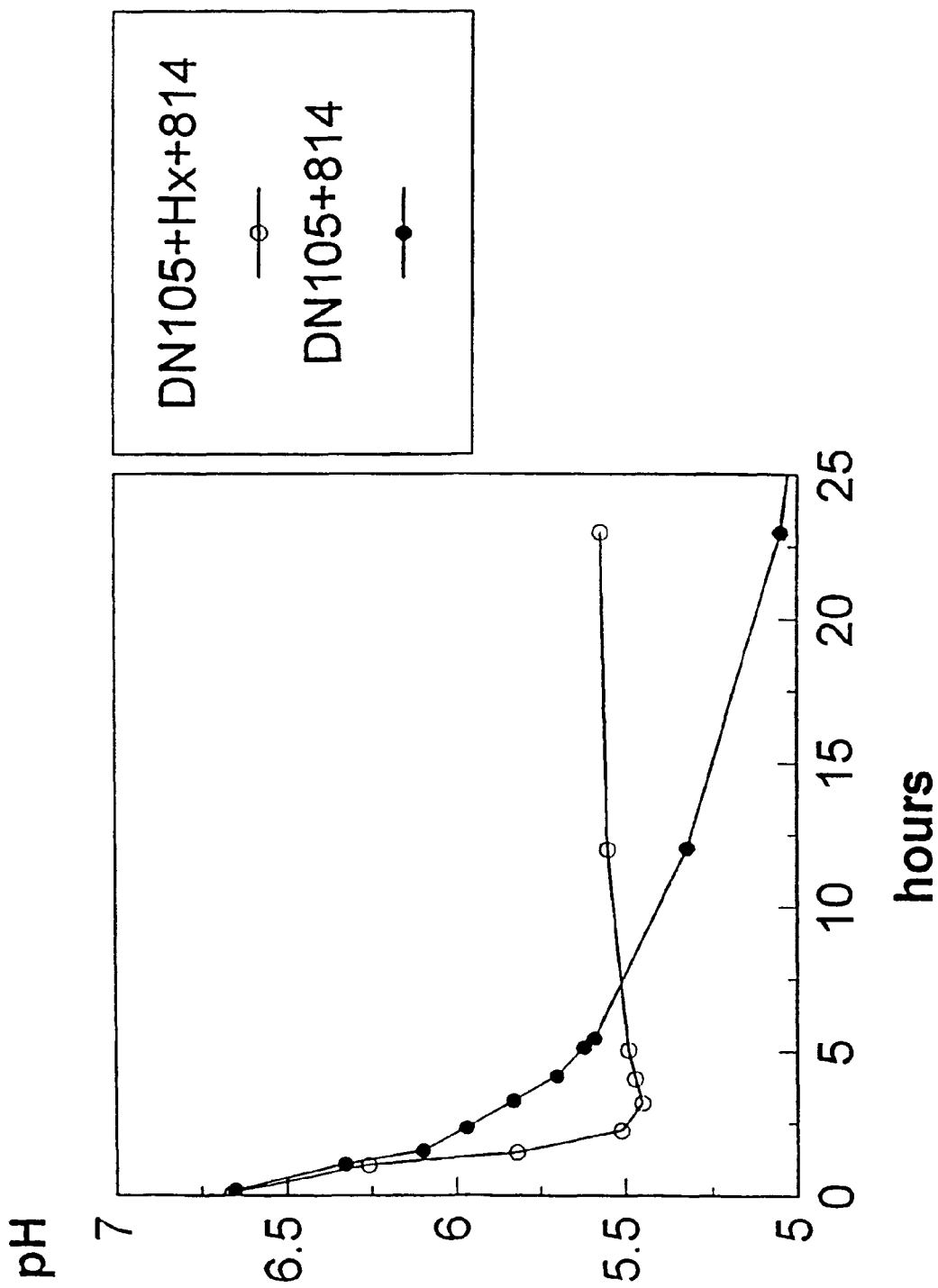

FIG. 2 shows the development of pH in RSM when inoculated with 25% vol/vol of the wild type strain CHCC373 or the mutant strain DN105 in the presence of the bacteriophage CHPC836 at a concentration of at least $10^8$ PFU/ml.

In further experiments the resistance of strain DN105 against various bacteriophages was studied in RSM with and without hypoxanthine added. The bacteriophages were added to RSM at $10^8$ to $10^9$ bacteriophages/ml.

The addition of hypoxanthine was used as a positive control for the bacteriophage infection, as the addition of this purine compound enabled bacteriophage attack (FIG. 3 A-H). In all cultures without hypoxanthine added strain DN105 acidified the milk to around pH 5.0, whereas with the addition of hypoxanthine none of the cultures reached a pH of below 5.4.

1.4 Discussion

This Example shows that the starvation of a Pur⁻ strain of *L. lactis* for purines causes total resistance to a range of bacteriophages and that the Pur⁻ strain of *L. lactis* is capable of effectively acidifying milk in the presence of a large number of bacteriophages for which the corresponding wild type is susceptible.

Thus, the present Example shows that it is possible to develop strains which under appropriate selected conditions, where the strains are incapable of growth, are completely resistant to bacteriophages and that such strains have retained the metabolic ability to acidify milk. Such a system of bacteriophage resistance can be introduced into any bacteria e.g. *Lactococcus* spp., *Lactobacillus* spp., *Leuconostoc* spp., *Pediococcus* spp., *Streptococcus* spp., *Propionibacterium* spp., *Bifidobacterium* spp., *Staphylococcus* spp., *Micrococcus* spp., *Bacillus* spp., *Actinomycetes* spp., *Enterobacteriaceae* spp. including *E. coli*, *Corynebacterium* spp. and *Brevibacterium* spp. in regard to e.g. production of a bacterial fermentation product such as lactate, diacetyl, acetoin, methanethiol, ethanol etc. if proliferation of the bacteria is not a requirement.

EXAMPLE 2

The Use of a Thymidine Auxotrophic *Lactococcus lactis* Strain for Obtaining Resistance Against Bacteriophages in Milk Fermentations 2.1. Materials and Methods (i) Bacterial Strains, Bacteriophages, Media and Growth Conditions The *Lactococcus lactis* strain MBP71 is a thymidine auxotrophic mutant (thyA) derived from the wild type strain CHCC373 (see Example 1). A sample of strain MBP71 has been deposited with Deutsche Sammlung von Mikroorganism and Zellkulturen GmbH, Mascheroder Weg 1b, D-38124 Braunschweig, Germany on 25 Jun. 1999 under the accession No. DSM12891.

Strain CHCC373 was routinely grown at 30° C. in M17 (Terzaghi & Sandine, 1975) supplemented with 0.5% of lactose, or in reconstituted skim milk (RSM) containing 9.5% (w/v) low fat skim milk powder. For the propagation of strain MBP71 the media were supplemented with 20 mg/l of thymidine, since neither M17 nor RSM support the growth of the ThyA⁻ phenotype. During the manipulations to construct strain MBP71 5 mg/l of erythromycin was added to the M17 based media to maintain the plasmid. Also, when growth at 37° C. was required during these manipulations M17 based media were supplemented with 50 mM of NaCl to enhance growth. *E. coli* DH5α (Life Technologies Inc., USA) was grown in LB medium supplemented with 100 mg/l of erythromycin to maintain the transformed plasmid. The bacteriophage CHPC733 was used in growth experiments where strain MBP71 phage resistance was tested. For the bacteriophage handling and determination of titers see Example 1.

(ii) Construction of Plasmid with Deletion in thyA from Strain CHCC373

An about 800 by fragment upstream of thyA from strain CHCC373 was obtained by PCR on chromosomal DNA using the primers

```
TATAATCTGCAGGGTCACACTATCAGTAATTG
(SEQ ID NO: 1) and

TATTTTAAGCTTCACAGTCTGCTATTTTGATTC
(SEQ ID NO: 2),
``` which furthermore introduce a PstI and a HindIII site, respectively, in the fragment ends. The resulting fragment includes the −35 box of the thyA promoter, but not the −10 box. Another about 800 by fragment comprising an internal part of the thyA coding region was obtained by PCR on chromosomal DNA using the primers

```
TAAATTAAGCTTCGCAGACAAGATTTTTAAAC
(SEQ ID NO: 3) and

ATTTAAGTCGACGGCTCATAGTCCACAAGTTC
(SEQ ID NO: 4),
``` which introduce a HindIII and a SalI site, respectively. The resulting fragment include the whole coding region of thyA except the first 8 by and the last 34 bp. The two PCR fragments were purified by using the QIAquick PCR purification kit (QIAGEN GmbH, Germany), cut with the indicated enzymes, and purified again. The pGhost9 vector (Maguin et al., 1996) was cut with the restriction enzymes PstI and SalI and purified. Thereafter, about 150 ng of the vector and about 50 ng of each of the two fragments were ligated overnight at 16° C. in a total volume of 20 µl. From this mixture 10 µl was used to transform *E. coli* DH5α. Plasmid DNA was isolated from possible clones by growing them overnight in LB medium with 100 mg/l of erythromycin and subsequently using 1.5 ml of these cultures with the QIAprep spin miniprep kit protocol (QIAGEN GmbH, Germany). The purified plasmid DNA was cut with PstI and SalI and one of them, pMBP63, yielded a band of approx. 1600 bp. This construct was further verified by PCR with the primers that were used to produce the two fragments, and also with the two outer primers. Finally, the construct was verified by sequencing both strands over the region of the deletion with the two primers

```
GACTGTTGCCCCATAGCG        (SEQ ID NO: 5)    and

GCTTCGATTTTAGTATATGG      (SEQ ID NO: 6).
```

All primers were from TAG Copenhagen A/S, Copenhagen, Denmark.

(iii) Inactivation of the Chromosomal thyA Gene in Strain CHCC373

About 200 ng of pMBP63 was used to transform strain CHCC373. By employing the gene replacement feature (Biswas et al., 1993) of the pGhost9 vector the chromosomal thyA gene of strain CHCC373 was thereafter successfully inactivated. The resulting strain, MBP71, was shown to be a thymidine auxotrophic mutant.

(iv) Test for Acidification of RSM by Strains CHCC373 and MBP71

Overnight cultures of M17 with 0.5% lactose and 20 mg/l of thymidine were washed twice in an isotonic solution of the same volume as the overnight culture to remove residual thymidine. The cells were resuspended in a fresh isotonic solution of a volume which was 1/20 of the overnight culture. These resuspended cells were used to inoculate RSM to a given volume identified by the percentage volume of the overnight culture i.e. an inoculation of 100% (v/v) indicates that 5 ml of the resuspended cells have been used to inoculate 100 ml of RSM. The pH was monitored either on-line or by measuring the pH of 2.5 ml samples.

2.2. Results of the Acidification of RSM by *Lactococcus lactis* Strain MBP71

Figure 4:
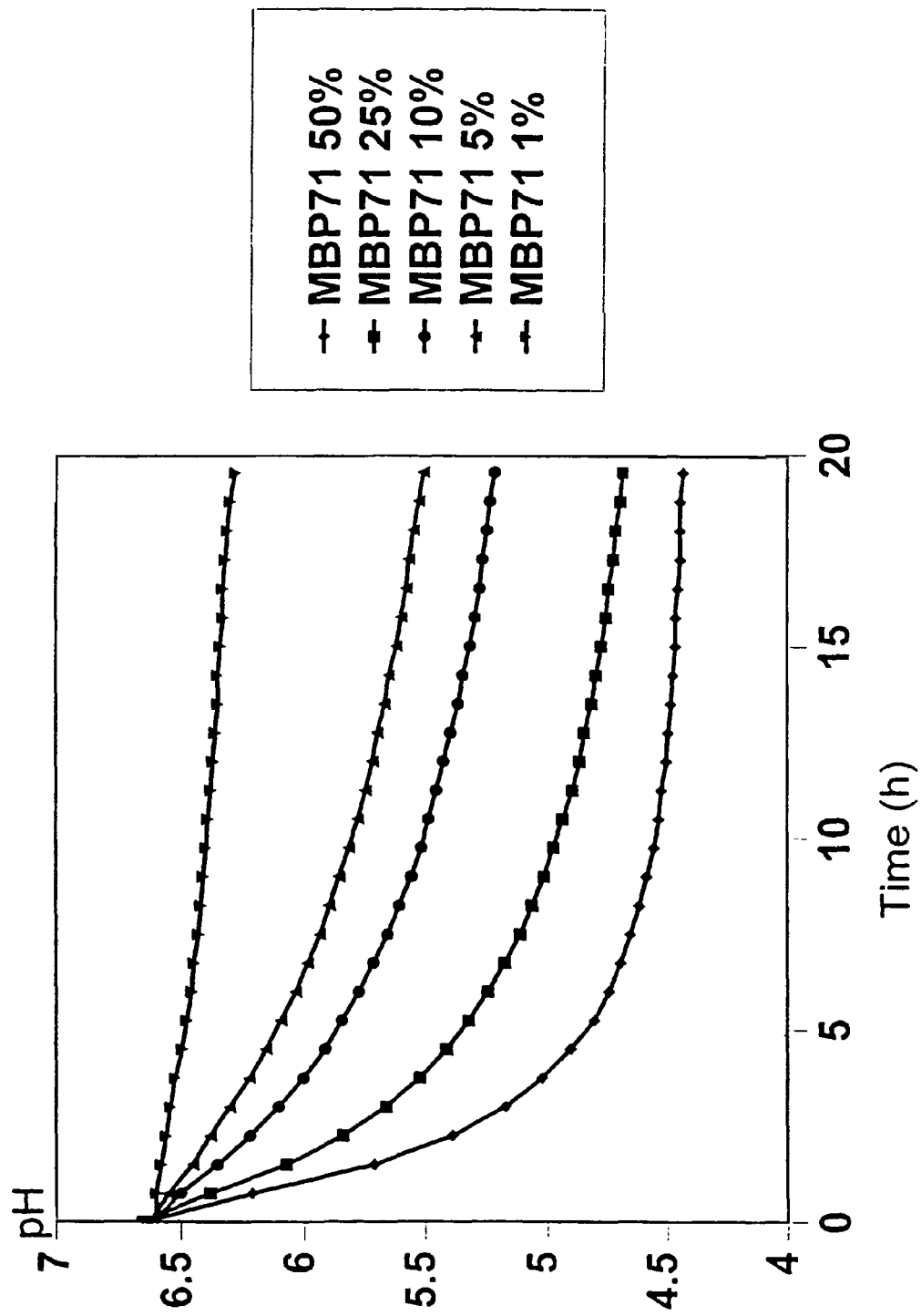
FIG. 4. shows the acidification of RSM by *Lactococcus lactis* strain MBP71 inoculated at different concentrations. The pH of 200 ml RSM cultures comprising strain MBP71 inoculated at 1%, 5%, 10%, 25%, and 50% (v/v) was monitored on-line.

To test the acidification of RSM by strain MBP71 this strain was inoculated in varying amounts as described in materials and methods. The pH of the substrate material was then monitored on-line over a 20 hour period. The results shown in FIG. 4 clearly demonstrate that MBP71 is able to acidify milk down to at least pH 4.5 under thymidine starvation conditions. When thymidine was added to the RSM, strain MBP71 acidified the substrate material similarly to strain CHCC373 (details not shown).

2.3. Studies of the Bacteriophage Resistance of *Lactococcus lactis* MBP71 in RSM As described above, a bacteriophage requires a susceptible host cell, which has intact DNA replication, RNA transcription and protein synthesis systems, for development. If a potential host is not capable of performing just one of these activities, bacteriophages can not proliferate in the cell. The thymidine auxotrophic strain MBP71 is only capable of DNA replication in the presence of thymidine, or another suitable precursor for dTTP. None of these precursors are present in RSM, and strain MBP71 is therefore not susceptible to bacteriophage attack under these conditions.

Figure 5:
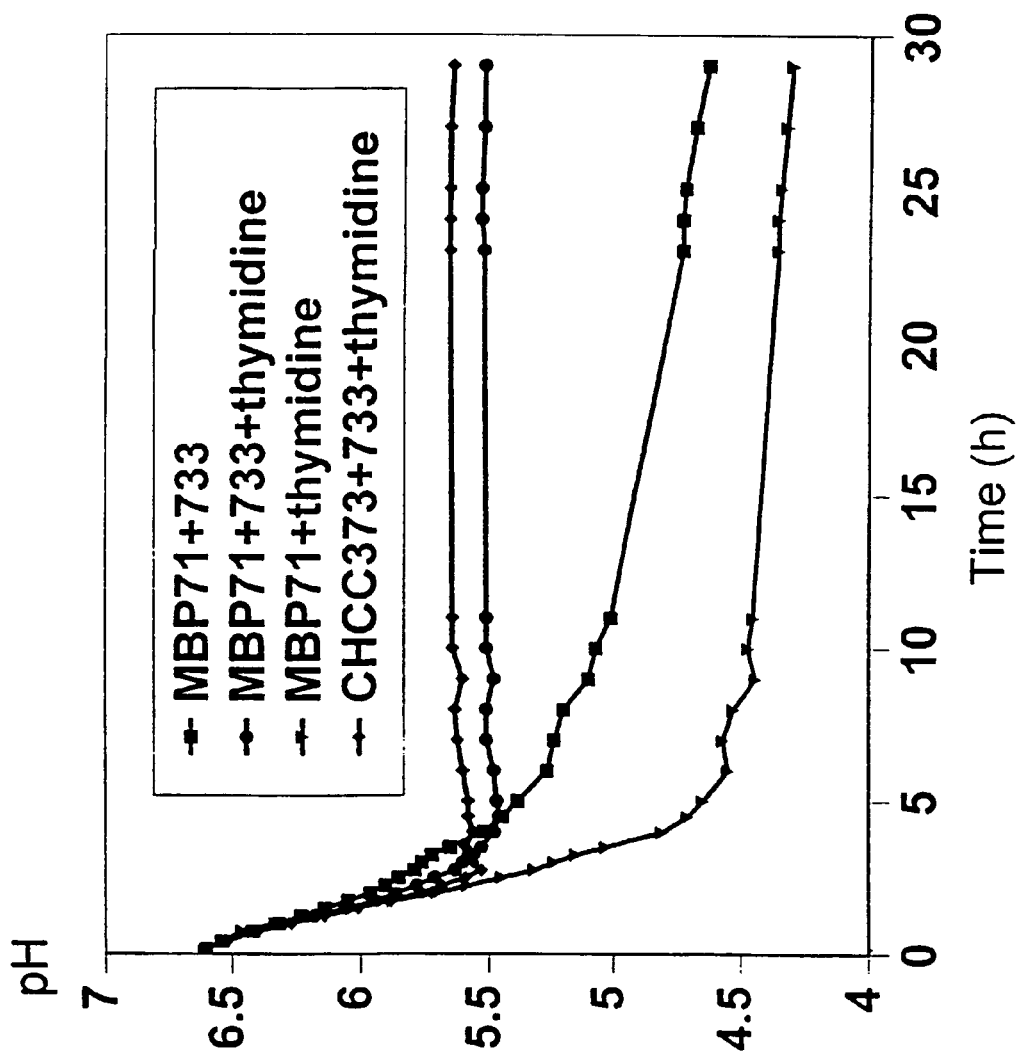
FIG. 5. shows the acidification of RSM, comprising bacteriophages and/or thymidine, by *Lactococcus lactis* strains MBP71 and CHCC373, which were inoculated at a concentration of 25% (v/v) in a volume of 100 ml RSM. The thymidine concentration was 20 mg/l and bacteriophage CHPC733 was added to a concentration of $2 \times 10^8$ PFU/ml. The pH was monitored by collecting 2.5 ml samples.

FIG. 5 shows the development of pH in 100 ml RSM inoculated with strain MBP71 at a concentration of 25% (v/v). When thymidine was present it was added to a final concentration of 20 mg/l. When the bacteriophage CHPC733 was present it was added to a concentration of $2 \times 10^8$ PFU/ml half an hour after cell inoculation. This gives a MOI (multiplicity of infection) of 0.2. The results in FIG. 5 clearly demonstrate that strain MBP71 acidifies RSM without thymidine down to at least pH 4.6 even in the presence of bacteriophages. However, when thymidine is added to the RSM strain MBP71 becomes susceptible to bacteriophage attack and the milk is only acidified down to pH 5.5, which is also close to the pH that is reached for the wild type strain CHCC373 in the presence of bacteriophages. If the bacteriophages are omitted, but thymidine is added, strain MBP71 acidifies the RSM similarly to strain CHCC373 (see FIG. 5, details not shown).

2.4. Discussion

This example shows that the starvation of a thyA strain of *L. lactis* for thymidine causes total resistance to bacteriophage CHPC733 and that the thyA strain of *L. lactis* is capable of effectively acidifying milk under these conditions. This is contrary to the wild type, which is not able to acidify the milk to an acceptable level under the same conditions. Although, strain MBP71 has only been tested for bacteriophage resistance to one bacteriophage it is believed that strain MBP71 is resistant to all, or most, types of bacteriophages.

REFERENCES

1. Biswas, I., A. Gruss, S. D. Ehrlich and E. Maguin. 1993. High-efficiency gene inactivation and replacement system for gram-positive bacteria. J. Bacteriol. 175:3628-3635.
2. Dickely, F., D. Nilsson, E. B. Hansen and E. Johansen. 1995. Isolation of *Lactococcus lactis* nonsense suppressors and construction of a food-grade cloning vector. Mol. Microbiol. 15:839-847.
3. Maguin, E., H. Prévost, S. D. Ehrlich and A. Gruss. 1996. Efficient insertional mutagenesis in Lactococci and other gram-positive bacteria. J. Bacteriol. 178:931-935.
4. Nilsson, D., and A. A. Lauridsen. 1992. Isolation of purine auxothrophic mutants of *Lactococcus lactis* and characterisation of the gene hpt encoding hypoxanthine guanine phosphoribosyltransferase. Mol. Gen. Genet. 235:359-364.
5. Richardson, G. H., C. A. Ernstrom, J. M. Kim and C. Daly. 1983. Proteinase negative variants of *Streptococcus cremoris* for cheese starters. J. Dairy Sci. 66:2278-2286.
6. Richardson, G. H., A. Y. Gamay, M. A. Shelaih, J. M. Kim and C. L. Hansen. 1984. Paired and single strain protease negative lactic Streptococci for cheese manufacturing. J. Dairy Sci. 67:518-521.
7. Terzaghi, B. E., and W. E. Sandine. 1975. Improved medium for lactic streptococci and their bacteriophages. Appl. Microbiol. 29:807-813.

SEQUENCE LISTING

<160> NUMBER OF SEQ ID NOS: 6

<210> SEQ ID NO 1
<211> LENGTH: 32
<212> TYPE: DNA
<213> ORGANISM: Artificial Sequence -continued

```
<220> FEATURE:
<223> OTHER INFORMATION: PCR-primer for the construction of plasmid with
      deletion in thyA from strain CHCC373

<400> SEQUENCE: 1
tataatctgc agggtcacac tatcagtaat tg                                32

<210> SEQ ID NO 2
<211> LENGTH: 33
<212> TYPE: DNA
<213> ORGANISM: Artificial Sequence
<220> FEATURE:
<223> OTHER INFORMATION: PCR-primer for the construction of plasmid with
      deletion in thyA from strain CHCC373

<400> SEQUENCE: 2
tattttaagc ttcacagtct gctattttga ttc                               33

<210> SEQ ID NO 3
<211> LENGTH: 32
<212> TYPE: DNA
<213> ORGANISM: Artificial Sequence
<220> FEATURE:
<223> OTHER INFORMATION: PCR-primer for the construction of a plasmid
      with deletion in thyA from strain CHCC373

<400> SEQUENCE: 3
taaattaagc ttcgcagaca agatttttaa ac                                32

<210> SEQ ID NO 4
<211> LENGTH: 32
<212> TYPE: DNA
<213> ORGANISM: Artificial Sequence
<220> FEATURE:
<223> OTHER INFORMATION: PCR-primer for the construction of a plasmid
      with deletion in thyA from strain CHC373

<400> SEQUENCE: 4
atttaagtcg acggctcata gtccacaagt tc                                32

<210> SEQ ID NO 5
<211> LENGTH: 18
<212> TYPE: DNA
<213> ORGANISM: Artificial Sequence
<220> FEATURE:
<223> OTHER INFORMATION: Sequencing primer used for the verification of
      the construction of plasmid with deletion in thyA from strain
      CHC373

<400> SEQUENCE: 5
gactgttgcc ccatagcg                                                18

<210> SEQ ID NO 6
<211> LENGTH: 20
<212> TYPE: DNA
<213> ORGANISM: Artificial Sequence
<220> FEATURE:
<223> OTHER INFORMATION: Sequencing primer used for the verification of
      the construction of plasmid with deletion in the thyA from strain
      CHC373

<400> SEQUENCE: 6
gcttcgattt tagtatatgg                                              20
```

The invention claimed is:

1. A method of fermenting milk comprising adding a cultured purine or thymidine auxotrophic bacterial strain to milk and keeping the milk under conditions where the bacterial culture is able to acidify the milk, wherein said auxotrophic bacterial strain is non-proliferating in the milk.

2. The method according to claim 1 wherein the purine or thymidine auxotrophic bacterial strain is a strain of a species selected from the group consisting of *Lactococcus* spp., *Lactobacillus* spp., *Leuconostoc* spp., *Pediococcus* spp., *Streptococcus* spp., *Propionibacterium* spp., *Bifidobacterium* spp., *Staphylococcus* spp., *Micrococcus* spp., *Bacillus* spp., *Enterobacteriaceae* spp. *Actinomycetes* spp., *Corynebacterium* spp. and *Brevibacterium* spp.

3. The method according to claim 2 wherein the purine or thymidine auxotrophic bacterial strain is a purine or thymidine auxotrophic strain of *Lactococcus lactis*.

4. The method according to claim 1 wherein the cultured purine or thymidine auxotrophic bacterial strain is added to the milk at a concentration between $10^5$ and $10^9$ CFU/ml or g of the milk.

5. The method according to claim 1 wherein the purine or thymidine auxotrophic bacterial strain is a strain that increases the size of its cells without mitosis when cultured in milk.

6. The method of claim 1 wherein the cultured purine or thymidine auxotrophic bacterial strain does not include any of the strains DN101, DN102, DN103, DN104 and DN105.

7. The method according to claim 1 wherein the bacterial strain is *Lactococcus lactis* strain DN105 deposited under the accession number DSM 12289.

8. The method according to claim 1 wherein the bacterial strain is *Lactococcus lactis* strain MBP71 deposited under the accession number DSM 12891.

9. A method for keeping the capability of a bacterial strain to ferment milk even in the presence of a bacteriophage, the method comprising:

adding a cultured purine or thymidine auxotrophic bacterial strain to milk, and keeping the milk under conditions where the purine or thymidine auxotrophic bacterial strain is able to ferment the milk, wherein said auxotrophic bacterial strain is non-proliferating in the milk.

10. A method of preparing a dairy flavouring and/or a product for cheese flavouring comprising, adding a cultured purine or thymidine auxotrophic bacterial strain to a dairy flavouring and/or a product for cheese flavouring starting material, and maintaining the thus-obtained inoculated dairy flavouring and/or product for cheese flavouring starting material under such conditions that the bacterial strain of the bacterial culture is metabolically active and is able to acidify or ferment the dairy flavouring and/or a product for cheese flavouring starting material, wherein said auxotrophic bacterial strain is non-proliferating in the dairy flavouring and/or a product for cheese flavouring starting material.

11. The method according to claim 2 wherein the purine or thymidine auxotrophic bacterial strain is a strain of *E. coli*.

12. The method of claim 1, further comprising propagating the purine or thymidine auxotrophic bacterial strain in a medium in which the strain is capable of replicating prior to adding the cultured purine or thymidine auxotrophic bacterial strain to milk.

13. The method of claim 1, wherein the milk further comprises a bacteriophage.

14. The method of claim 1, whereby the milk is acidified at least to pH 5.0.

15. The method of claim 1 which produces a dairy flavour, a product for cheese flavouring, a food product, or a feed product.

16. The method of claim 10, further comprising propagating the purine or thymidine auxotrophic bacterial strain in a medium in which the strain is capable of replicating prior to adding the cultured purine or thymidine auxotrophic bacterial strain to the dairy flavouring and/or product for cheese flavouring starting material.

17. The method of claim 10, wherein the dairy flavouring and/or product for cheese flavouring starting material further comprises a bacteriophage.

18. The method of claim 10, wherein the cultured purine or thymidine auxotrophic bacterial strain is added to the dairy flavouring and/or product for cheese flavouring starting material at a concentration between $10^5$ and $10^9$ CFU/ml or g of the dairy flavouring and/or product for cheese flavouring starting material.

19. The method of claim 9 which results in preparation of a product selected from the group consisting of a dairy flavour, a product for cheese flavouring, a food product, and a feed product.

* * * * *